United States Patent
Cheng et al.

(10) Patent No.: US 11,444,654 B2
(45) Date of Patent: Sep. 13, 2022

(54) SYSTEM AND METHOD FOR INDEX MODULATION BASED JOINT MODE FREQUENCY HOPPING WITH VORTEX ELECTROMAGNETIC WAVES FOR ANTI-JAMMING

(71) Applicant: Xidian University, Xi'an (CN)

(72) Inventors: Wenchi Cheng, Xi'an (CN); Liping Liang, Shaanxi Province (CN); Hailin Zhang, Xi'an (CN)

(73) Assignee: XIDIAN UNIVERSITY, Xi'an (CN)

( * ) Notice: Subject to any disclaimer, the term of this patent is extended or adjusted under 35 U.S.C. 154(b) by 0 days.

(21) Appl. No.: 17/383,581

(22) Filed: Jul. 23, 2021

(65) Prior Publication Data

US 2022/0123782 A1 Apr. 21, 2022

(30) Foreign Application Priority Data

Oct. 16, 2020 (CN) .......................... 202011107292.0

(51) Int. Cl.
*H04B 1/715* (2011.01)
*H04K 3/00* (2006.01)

(52) U.S. Cl.
CPC ............. *H04B 1/715* (2013.01); *H04K 3/228* (2013.01); *H04B 2001/7152* (2013.01)

(58) Field of Classification Search
CPC ............ H04B 1/715; H04B 2001/7152; H04K 3/228; H04K 3/25; H01Q 1/523; H01Q 1/525; H04L 27/3483
See application file for complete search history.

(56) References Cited

U.S. PATENT DOCUMENTS

| 9,853,799 | B2 * | 12/2017 | Dutronc | .................. H04L 5/04 |
| 2017/0117626 | A1 * | 4/2017 | Sajuyigbe | ............. H01Q 1/523 |

\* cited by examiner

*Primary Examiner* — Sung S Ahn
(74) *Attorney, Agent, or Firm* — Thomas | Horstemeyer, LLP (57) ABSTRACT

A system and method of index modulation based joint mode frequency hopping with vortex electromagnetic waves for anti-jamming are provided. The system is additionally provided with a transmit signal carrier selector that provides diversified options, a receive signal carrier selector that is strictly synchronized with the transmit signal carrier selector, and a group of fast Fourier transformation modules to output a binary demodulation signal with jamming eliminated. The method includes: binary information division; index modulation and information modulation; information loading and hopping; information transmission, de-hopping, and jamming filtering; and calculation of the jamming probability and an average bit error rate. The present disclosure combines orbital angular momentum modes and subcarrier frequencies to form OAM mode-subcarrier frequency pair sets so as to diversify information transmission carriers, and performs simultaneously modulation and hopping to increase a spectrum efficiency and enhance the anti-jamming capability.

14 Claims, 2 Drawing Sheets

Transmitter

FIG. 1 (a)

Receiver

SYSTEM AND METHOD FOR INDEX MODULATION BASED JOINT MODE FREQUENCY HOPPING WITH VORTEX ELECTROMAGNETIC WAVES FOR ANTI-JAMMING

CROSS REFERENCE TO RELATED APPLICATION

This patent application claims the benefit and priority of Chinese Patent Application No. 202011107292.0 filed on Oct. 16, 2020, the disclosure of which is incorporated by reference herein in its entirety as part of the present application.

TECHNICAL FIELD

The present disclosure belongs to a technical field of wireless communications, and relates to vortex electromagnetic wave anti-jamming, and in particular, to a system and method of index modulation based joint mode frequency hopping with vortex electromagnetic waves for anti-jamming. The present disclosure is applied for anti-jamming in wireless communication scenarios, such as indoor local area networks, cellular network communications, and radar.

BACKGROUND ART

Information security is one of hot research topics in the field of wireless communications. Frequency hopping (FH) techniques can effectively anti-jamming by rapidly changing the carrier frequency of transmit signals according to a preset frequency hopping pattern, to guarantee information security of wireless communication systems. However, with an increase of data transmission rate and coexistence of various heterogeneous network services, wireless spectrum resources become increasingly scarce, which directly affect the anti-jamming capability improvement of FH techniques. In addition, most carriers are in idle state in FH techniques. As a result, low spectrum utilization of the wireless communication systems hardly meets a demand for high-rate information transmission of future wireless communications.

The authors of the paper titled "FREQUENCY INDEX MODULATION FOR LOW COMPLEXITY LOW ENERGY COMMUNICATION NETWORKS" introduced the concept of index modulation and studied the frequency index modulation scheme for low complexity and energy in Internet of Things (IoT) wireless communications, aiming to reduce transmit energy and peak-to-average power ratio (PAPR) of an orthogonal frequency division multiplexing (OFDM) system without sacrificing the data rate. Although this scheme can be simplified to a slow FH technique in which multiple sub-narrowbands hop simultaneously to increase the spectrum efficiency, hopping more sub-narrowbands increases the probability that useful signals of the system are jammed, thus decreasing the anti-jamming performance and effective capacity of the entire system.

The authors of the paper titled "FREQUENCY HOPPING COMMUNICATION TECHNOLOGY BASED ON INDEX MODULATION IN IFFT/FFT FRAMEWORK" studied an index modulation-based frequency hopping anti-jamming method, which increases the spectrum efficiency of wireless communications by activating multiple subcarriers for hopping simultaneously. However, simultaneously activating multiple subcarriers increases the proportion of selected subcarriers in the entire spectrum band, which increases the probability that useful signals of the system are jammed and decreases the difficulty for hostile signals to track and jam useful signals, thereby increasing the bit error rate of wireless communication systems.

In summary, there is a conflict between increasingly scarce "golden" spectrum resources and the demand for enhancing the anti-jamming capability of wireless communication systems by increasing the number of available hopping carriers. There is also a conflict between the spectrum efficiency and the anti-jamming capability caused by simultaneous hopping of multiple carriers. With this regard, it is difficult for the existing frequency hopping techniques to significantly increase the spectrum efficiency while guarantee the anti-jamming capability of wireless communication systems.

Orbital angular momentum (OAM) provides a potential solution to achieve an effective anti-jamming and a high spectrum efficiency for wireless communications. Unlike the conventional spin angular momentum describing the polarization characteristics of electromagnetic waves, OAM describes a helical phase front of electromagnetic waves and OAM beam is called the vortex electromagnetic waves. The topological charge of OAM is also called mode. The vortex electromagnetic waves carrying different modes are orthogonal to each other in azimuth angle, so that the multi-mode vortex electromagnetic waves can be simultaneously transmitted at the same frequency band, which provides a brand-new solution paradigm for multiplexing transmission in wireless communications. However, it is a tough issue to be solved regarding how to use the OAM signals to achieve both the high spectrum efficiency and the robust anti-jamming capability. At present, almost no research is carried out in China or other countries on how to use OAM and frequency to solve the above-mentioned issues.

SUMMARY

To solve the shortcomings and issues of the conventional art, the present disclosure proposes a system and method for index modulation based joint mode frequency hopping with vortex electromagnetic waves for anti-jamming to significantly increase the spectrum efficiency and decrease the bit error rate.

The present disclosure provides a system of index modulation based joint mode frequency hopping with vortex electromagnetic waves for anti-jamming, where the system includes a transmitter and a receiver; the transmitter and the receiver each includes a subcarrier index selector configured to determine a carrier for signal transmission; the transmitter transmits an input signal to a transmit antenna module via a signal modulation module; after the signal from the transmitting antenna module is received by a receive antenna module, a binary demodulation signal is output after the signal is processed by a carrier demodulation and a band pass filter (BPF) sequentially; wherein, the transmitter is provided with a selector for selecting diversely signal transmit carriers between the input signal and the transmit antenna module, the signal transmit carrier selector is formed by a one-way serial connection of a transmit combination mapper and two parallel transmit index selectors, and the two parallel transmit index selectors are respectively a transmit OAM mode index selector and a transmit subcarrier index selector; the transmit antenna module is an OAM transmit antenna module; the receiver is provided with a signal receive carrier selector that is strictly synchronized with the signal transmit carrier selector between the receive antenna module and the BPF, the signal receive carrier selector is formed by a direct one-way serial connection between two parallel receive index selectors and a receive combination mapper, the two parallel receive index selectors are respectively a receive OAM mode index selector and a receive subcarrier index selector; a received signal of the receiver is sequentially transmitted to the receive combination mapper, the two parallel index selectors, and the BPF; the receive antenna module is an OAM receive antenna module; a group of fast Fourier transformation (FFT) modules are also provided between the BPF and an output signal; after the signal transmitted from the OAM transmit antenna module is received by the OAM receive antenna module, the signal is processed by the receive combination mapper, two parallel receive index selectors, the BPF, and the FFT module sequentially, and the binary demodulation signal with jamming eliminated is output as binary information bits.

The present disclosure further provides a method of index modulation based joint mode frequency hopping with vortex electromagnetic waves for anti-jamming, where the method is implemented based on the system of index modulation based joint mode frequency hopping with vortex electromagnetic waves for anti-jamming according to claims 1 to 2, and includes the following steps:

step 1: dividing the binary information; wherein the binary information bits input by the system of index modulation based joint mode frequency hopping with vortex electromagnetic waves for anti-jamming are divided into signal modulation information bits and two-dimensional index modulation information bits, it is assumed that the total number of information bits of each frame transmitted by the system of index modulation based joint mode frequency hopping with vortex electromagnetic waves for anti-jamming is $p=p_1+p_2$, wherein the former $p_1$, bits represent the index modulation information bits corresponding to OAM mode-subcarrier frequency pairs combined by activated OAM modes and activated subcarriers, and the latter $p_2$ bits represent the signal modulation information bits required by the activated OAM mode-subcarrier frequency pairs for transmitting an M-ary signal modulation:

step 2: performing the index modulation and an information modulation; wherein, it is assumed that the OAM transmit antenna module and the OAM receive antenna module respectively uses a circular array antenna with $N_t$ and $N_f$ evenly distributed array elements, and the OAM transmit antenna module is configured to generate $N_t$ OAM modes; it is further assumed that a total number of available subcarriers by the system of index modulation based joint mode frequency hopping with vortex electromagnetic waves for anti-jamming is $N_f$; I OAM mode-subcarrier frequency pairs are formed; the transmit combination mapper is configured to control the transmit OAM mode index selector to select and activate I OAM modes from the $N_t$ OAM modes based on the index modulation information bits, and meanwhile to control the transmit subcarrier index selector to activate I subcarriers from the $N_f$ subcarriers, and the activated I OAM modes and the activated I subcarriers are combined into I OAM mode-subcarrier frequency pairs without repeating and in a one-to-one correspondence way based on the index modulation information bits; $\log_2 M$ signal modulation information bits are mapped to a constellation point after an M-ary modulation, wherein one constellation point is carried by each OAM mode-subcarrier frequency pair, and then there is $p_2=I \log_2 M$;

step 3: loading the constellation point information to realize the hopping of the OAM mode-subcarrier frequency pairs; wherein the constellation point information carried by the i-th activated OAM mode-subcarrier frequency pair is fed to all the array elements of a transmit uniform circular array antenna to generate mutually orthogonal vortex electromagnetic wave signals, wherein 1≤i≤I, and there is a phase difference $$e^{j\frac{2\pi}{N_t}l_i}$$

between adjacent array elements; wherein $l_i$ represents an OAM mode order corresponding to the i-th activated OAM mode-subcarrier frequency pair, and $|l_i| \le N_t/2$; the constellation point information carried by each OAM mode-subcarrier frequency pair is loaded on a subcarrier frequency $f_i$ corresponding to the i-th activated OAM mode-subcarrier frequency pair simultaneously, to realize I OAM mode-subcarrier frequency pairs hopping simultaneously, so as to generate I mutually independent and orthogonal vortex electromagnetic wave signals; and the I mutually independent and orthogonal vortex electromagnetic wave signals are transmitted via the transmit uniform circular array antenna;

step 4: transmitting the information; wherein the I mutually independent and orthogonal vortex electromagnetic wave signals are transmitted via channels, and the vortex electromagnetic wave signals transmitted from the transmit uniform circular array antenna are received by the receive uniform circular array antenna;

step 5: performing a de-hopping on the information and filtering out jamming signals: the receiver performs the de-hopping on the received I mutually independent and orthogonal vortex electromagnetic wave signals in two mutually independent domains, including an OAM mode domain and a frequency domain, and filters out jamming signals with an orthogonality between OAM modes and an orthogonality between subcarrier frequencies, to obtain signals with a fixed intermediate frequency and without any OAM modes:

step 6: calculating a jamming probability; wherein the jamming probability is analyzed and calculated when the signals with the fixed intermediate frequency and without any OAM modes have $I_J$ OAM mode-subcarrier frequency pairs being jammed per hop, wherein $0 \le I_J \le I$; and all possible and different values of $I_J$ are considered to calculate the jamming probability of useful signals being jammed under different $I_J$ values;

step 7: outputting the binary information bits and calculating a conditional bit error rate; wherein, assuming that the de-hopped signals with the fixed intermediate frequency and without any OAM modes have $I_J$ OAM mode-subcarrier frequency pairs being interfered, and the receiver knows channel state information corresponding to I OAM mode-subcarrier frequency pairs, an estimated transmit binary information bits are output after a maximum likelihood decoder jointly estimates the transmit I mutually independent and orthogonal vortex electromagnetic wave signals; and the conditional bit error rate is calculated by using a moment generating function when the de-hopped signals with the fixed intermediate frequency and without any OAM modes have $I_J$ OAM mode-subcarrier frequency pairs being jammed; and step 8: calculating an average bit error rate; wherein, for all possible and different values of $I_J$ a weighted summation is performed on the conditional bit error rate when the de-hopped signals with the fixed intermediate frequency and without any OAM modes have $I_J$ OAM mode-subcarrier frequency pairs being jammed, to calculate the average bit error rate of the method of index modulation based joint mode frequency hopping with vortex electromagnetic waves for anti-jamming, so as to measure and evaluate an anti-jamming capability of index modulation based joint mode frequency hopping with vortex electromagnetic waves for anti-jamming; wherein the weighted value is the jamming probability when the signals with the fixed intermediate frequencies and without the OAM modes have $I_J$ OAM mode-subcarrier frequency pairs being jammed per hop.

The technical problem to be solved by the present disclosure is how to significantly increase the spectrum efficiency and greatly improve the anti-jamming capability of wireless communication systems with limited spectrum resources.

Compared with the conventional art, the present disclosure has the following beneficial effects.

(1) The spectrum efficiency is significantly increased. According to the present disclosure, two orthogonal domains, including an OAM mode domain and a frequency domain, are fully used, and OAM modes and subcarrier frequencies are combined without repeating and in a one-to-one correspondence way to form the OAM mode-subcarrier frequency pair sets, so as to diversify options of the OAM mode-subcarrier frequency pairs as information transmission carriers. The binary information bits input by the system of index modulation based joint mode frequency hopping with vortex electromagnetic waves for anti-jamming are divided into two parts: the signal modulation information bits and the two-dimensional index modulation information bits, where the signal modulation information bits are mapped to M-ary constellation points, and the two-dimensional index modulation information bits are used to determine which of the OAM mode-subcarrier frequency pairs is/are activated to carry the constellation points mapped to the signal modulation information bits. Compared with the existing frequency hopping techniques based on one-dimensional index modulation, the two-dimensional OAM mode and subcarrier frequency index modulation used in the present disclosure significantly increases the spectrum efficiency of the wireless communication systems.

(2) The anti-jamming capability is improved. The conventional art uses subcarriers as the information transmission carriers. The present disclosure, however, uses the OAM mode-subcarrier frequency pairs as the information transmission carriers. When the same number of subcarriers are activated, the present disclosure diversifies information transmission carriers and decreases the probability of signals being jammed. In addition, based on the orthogonality between the OAM modes and the orthogonality between the subcarrier frequencies, the receiver performs the de-hopping in two mutually independent domains, including the OAM mode domain and the frequency domain, and filters out jamming signals, on the received multiple mutually independent and orthogonal vortex electromagnetic wave signals to decrease the probability of signals being jammed, thereby significantly decreasing the average bit error rate of the system, and improving the anti-jamming capability of the wireless communication systems.

DETAILED DESCRIPTION OF THE EMBODIMENTS

The present disclosure is described in detail below with reference to the accompanying drawings and specific embodiments.

Embodiment 1

To increase the spectrum efficiency of frequency hopping anti-jamming systems, the conventional art uses the index modulation to activate multiple subcarriers to perform hopping simultaneously. However, simultaneous hopping of multiple subcarriers significantly increases the probability of signals being jammed and decreases the anti-jamming capability of frequency hopping anti-jamming systems. In addition, the limited spectrum resources are difficult to meet the demand for enhancing the anti-jamming capability of the frequency hopping wireless communication systems by increasing the number of available FH carriers. It is also a tough issue to be solved regarding how to use the OAM signals of vortex electromagnetic waves to achieve the both high spectrum efficiency and strong anti-jamming capability.

To solve the above issues, the present disclosure proposes a system and method of index modulation based joint mode frequency hopping with vortex electromagnetic waves for anti-jamming after research.

Figure 1:
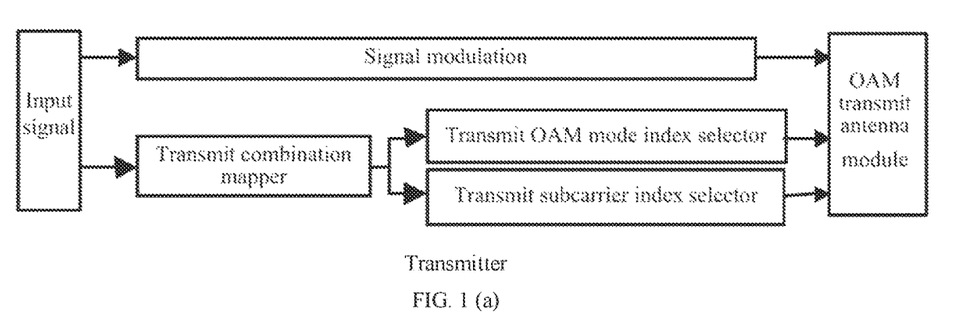
FIG. 1(a) and FIG. 1(b) are block diagrams showing a system of index modulation based joint mode frequency hopping with vortex electromagnetic waves for anti-jamming according to the present disclosure.

In one aspect, the present disclosure provides a system of index modulation based joint mode frequency hopping with vortex electromagnetic waves for anti-jamming, including a transmitter and a receiver. The transmitter includes a transmit subcarrier index selector, and the receiver includes a receive subcarrier index selector. These subcarrier index selectors are configured to determine which of subcarriers is/are used as an information transmission carrier(s). The transmitter modulates input binary bits into M-ary constellation points via a signal modulation module, and transmits the M-ary constellation points to a transmit antenna module. After the signal from the transmit antenna module is received by a receive antenna module, a binary demodulation signal is output after the signal is processed by a carrier demodulation and a band pass filter (BPF) sequentially. Compared to the existing frequency hopping systems, the transmitter of the present disclosure is provided with a selector between the input signal and the transmit antenna module as shown in FIG. 1(a), which allows the anti-jamming system to select diversely signal transmission carriers. The signal transmit carrier selector is formed by a one-way serial connection of a transmit combination mapper and two parallel transmit index selectors. The two parallel transmit index selectors of the present disclosure are respectively a transmit OAM mode index selector and a transmit subcarrier index selector. The transmit combination mapper of the present disclosure can determine a combination pattern of activated OAM modes and subcarriers, to form an OAM mode-subcarrier frequency pair set. The transmit OAM mode index selector and the transmit subcarrier index selector respectively determine which part of the OAM modes and subcarriers are activated. The transmit antenna module of the present disclosure is an OAM transmit antenna module. The receiver of the present disclosure is provided with a signal receive carrier selector that is strictly synchronized and consistent with the signal transmit carrier selector between the receive antenna module and the BPFs. The signal receive carrier selector is formed by a direct one-way serial connection between two parallel receive index selectors and a receive combination mapper. The two parallel receive index selectors are respectively a receive OAM mode index selector and a receive subcarrier index selector. The receiver can determine which of the OAM mode-subcarrier frequency pairs is/are activated by the transmitter via the signal receive carrier selector. The receiver of the present disclosure sequentially transmits the signals received by the receive antenna module to the receive combination mapper, two parallel index selectors, and BPFs. The receive antenna module of the present disclosure is an OAM receive antenna module. Considering that the anti-jamming system needs to perform a de-hopping and filters jamming signals on the received signals in a newly provided OAM mode dimension, a group of fast Fourier transformation (FFT) modules are also provided between the BPFs and output signals in the present disclosure. After the signal send by the OAM transmit antenna module is received by the OAM receive antenna module, the signal is processed by the receive combination mapper, the two parallel receive index selectors, the BPFs, and the newly provided FFT modules sequentially, and as a result, the binary demodulation signal with jamming eliminated is output as binary information bits.

The present disclosure provides the system of index modulation based joint mode frequency hopping with vortex electromagnetic waves for anti-jamming. Compared with the anti-jamming systems of the conventional art, the present disclosure is provided with the transmit combination mapper, the transmit OAM mode index selector, the receive combination mapper, the receive OAM mode index selector, and the group of FFT modules to form a complete anti-jamming system. Via the newly provided modules, the present disclosure extends the information transmission from the conventional one-dimensional carrier frequency to two-dimensional mutually independent and orthogonal OAM mode and carrier frequency, and make full use of the orthogonality of the OAM modes to greatly improve the anti-jamming capability and significantly increase the spectrum efficiency of the anti-jamming system on a precondition that the spectrum resources are limited and no extra time and power resources are consumed.

Embodiment 2

The overall structure of a system of index modulation based joint mode frequency hopping with vortex electromagnetic waves for anti-jamming is the same as that in embodiment 1. It is assumed that a total number of the binary information bits of the input signal of the transmitter at each frame is $p=p_1+p_2$, where the former $p_1$ bits are the binary information bits for two-dimensional index modulation information, and the latter $p_2$ bits are the binary information bits for signal modulation, where the two-dimensional index refers to the OAM mode index and the subcarrier frequency index. Because the signal transmission is directly extended from the one-dimensional carrier frequency to the two-dimensional OAM mode and carrier frequency, and the OAM mode and subcarriers are mutually independent and orthogonal, the OAM transmit antenna module of the transmitter of the present disclosure transmits multiple mutually independent and orthogonal vortex electromagnetic beams. The OAM receive antenna module of the receiver receives the multiple mutually independent and orthogonal vortex electromagnetic beams transmitted by the OAM transmit antenna module, and the receiver finally outputs the binary information bits with jamming eliminated that contain the two-dimensional index modulation and the signal modulation.

Unlike the existing anti-jamming technique that transmits signals via plane electromagnetic waves, the present disclosure transmits the vortex electromagnetic wave signals by adding an orthogonal dimension of the OAM modes. The present disclosure uses the mutual independence and orthogonality of the OAM modes and the subcarrier frequencies to enrich the information transmission carriers. The index modulation information bits of the input signals are increases based on the index modulation. The receiver eliminates jamming signals in two dimensions via two dimensions of the OAM modes and the subcarrier frequencies.

Embodiment 3

Figure 1B:
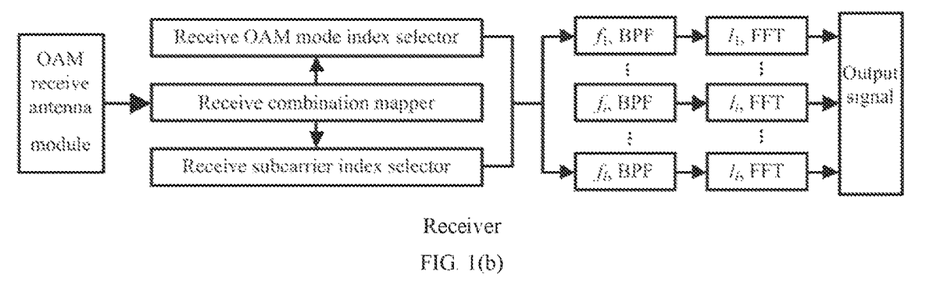
Figure 2:
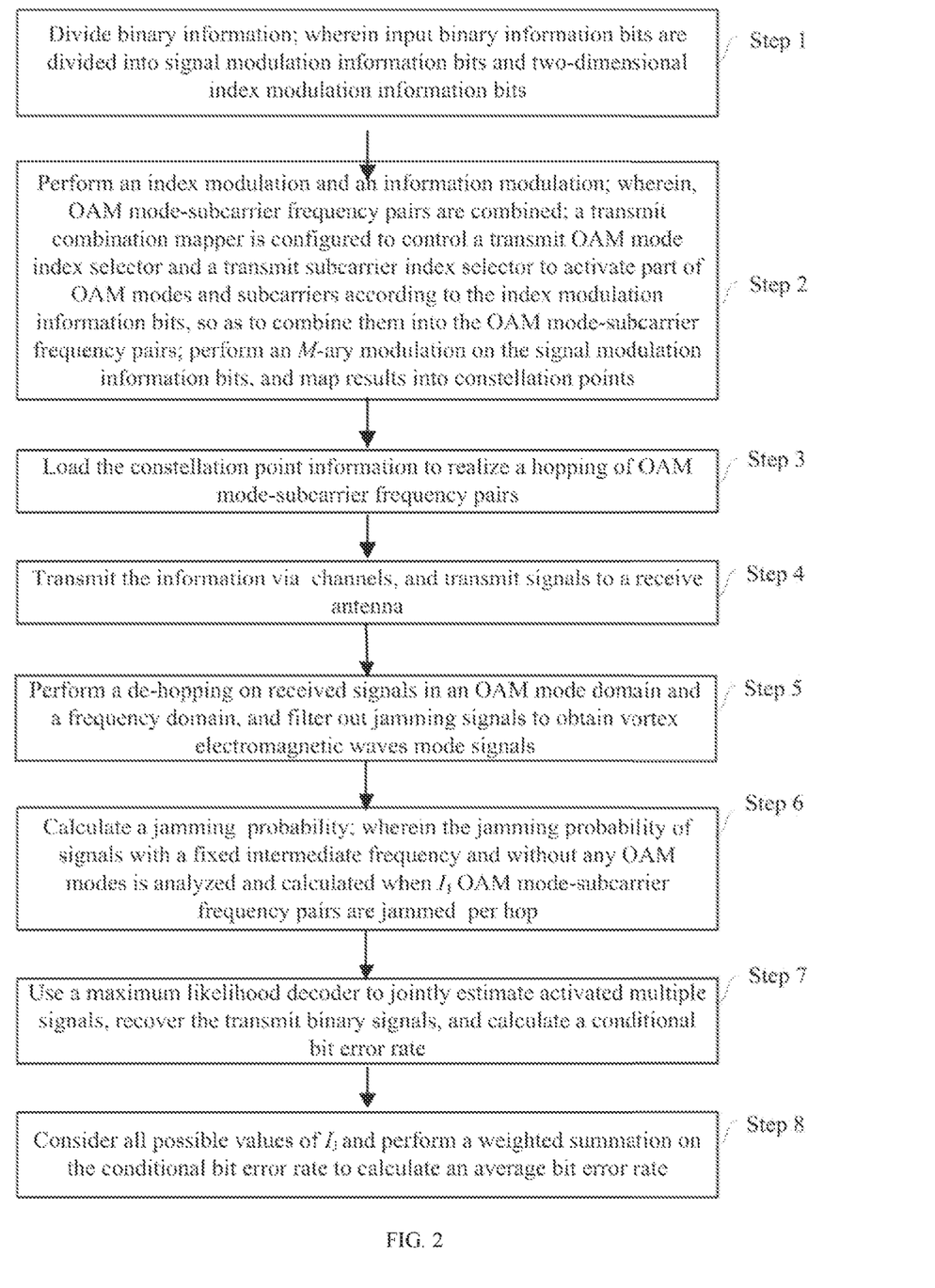
FIG. 2 is a schematic flowchart of a method of index modulation based joint mode frequency hopping with vortex electromagnetic waves for anti-jamming according to the present disclosure.

The present disclosure further relates to a method of index modulation based joint mode frequency hopping with vortex electromagnetic waves for anti-jamming, as shown in FIG. 2. The method is implemented based on the system of index modulation based joint mode frequency hopping with vortex electromagnetic waves for anti-jamming as shown in FIG. 1(a) and FIG. 1(b). Wherein, a transmitter of the system includes an input signal, a signal modulation module, a transmit combination mapper, a transmit OAM mode index selector, a transmit subcarrier index selector, and an OAM transmit antenna module; and a receiver of the system includes an OAM receive antenna module, a receive combination mapper, a receive OAM mode index selector, a receive subcarrier index selector, a group of BPFs, and a group of FFT modules. The method of index modulation based joint mode frequency hopping with vortex electromagnetic waves for anti-jamming according to the present disclosure includes the following steps 1-8.

Step 1: The binary information is divided. The binary information bits input by the system of index modulation based joint mode frequency hopping with vortex electromagnetic waves for anti-jamming are divided into signal modulation information bits and two-dimensional index modulation information bits. It is assumed that the total number of information bits of each frame transmitted by the system of index modulation based joint mode frequency hopping with vortex electromagnetic waves for anti-jamming is $p=p_1+p_2$, where the former $p_1$ bits represent the binary information bits corresponding to the two-dimensional index modulation information, and the latter $p_2$ bits represent the signal modulation information bits required by the activated OAM mode-subcarrier frequency pairs for transmitting M-ary signal modulation. The two-dimensional index refers to the OAM mode index and the subcarrier frequency index. The former $p_1$ bits are directly mapped to the OAM mode-subcarrier frequency pairs formed by the activated OAM modes and the activated subcarriers.

Step 2: An index modulation and an information modulation are performed. It is assumed that the OAM transmit antenna module uses a circular array antenna with $N_t$ evenly distributed array elements, and can generate $N_t$ OAM modes. Theoretically, the number of OAM modes $N_t$ is an integer, and is not limited. The number of transmit array elements without overlapping with each other is related to a radius and a carrier wavelength of transmit uniform circular array antenna. It is further assumed that the total number of subcarriers available by the system of index modulation based joint mode frequency hopping with vortex electromagnetic waves for anti-jamming is $N_t$, the value of which is related to a total bandwidth actually allocated to the anti-jamming system and a bandwidth required for signal transmission. I OAM mode-subcarrier frequency pairs are formed. The transmit combination mapper of the present disclosure is configured to control the transmit OAM mode index selector to select and activate I OAM modes from $N_t$ OAM modes based on the index modulation information bits in step 1, and meanwhile to control the transmit subcarrier index selector to activate I subcarriers from $N_t$ subcarriers, and the activated I OAM modes and the activated I subcarriers are combined into I OAM mode-subcarrier frequency pairs without repeating and in a one-to-one correspondence way based on the index modulation information bits to form an OAM mode-subcarrier frequency pair set, thus completing the index modulation. Considering that the present disclosure focuses on anti-jamming, the former $p_1$ information bits of each frame transmitted by the system are regularly changed according to the index modulation information bits corresponding to the OAM mode-subcarrier frequency pair set that can be combined by the transmit combination mapper. The $\log_2 M$ signal modulation information bits are mapped to a constellation point after an M-ary modulation, wherein one constellation point is carried by each OAM mode-subcarrier frequency pair, and then there is $p_2 = I \log_2 M$. In this way, the information modulation of the input signal is completed in the signal modulation module.

Step 3: The constellation point information is loaded to realize the hopping of OAM mode-subcarrier frequency pairs. In the present disclosure, according to the index modulation and the information modulation, each activated OAM mode-subcarrier frequency pair is mapped to a constellation point obtained after the signal modulation. The constellation point information carried by the i-th activated OAM mode-subcarrier frequency pair is fed to all the array elements of the transmit uniform circular array antenna, where $1 \leq i \leq I$, and there is a phase difference $$e^{j\frac{2\pi}{N_t}l_i}$$

between adjacent array elements; where $l_i$ represents the OAM mode order corresponding to the i-th activated OAM mode-subcarrier frequency pair, and $|l_i| \leq N_t/2$. Given an OAM mode, after the same constellation point information is fed to the array elements with the same phase difference between adjacent transmit array elements, the vortex electromagnetic wave signal corresponding to the OAM mode is generated. For I activated OAM mode-subcarrier frequency pairs, I mutually orthogonal vortex electromagnetic wave signals in the OAM mode domain can be obtained. The constellation point information corresponding to each OAM mode-subcarrier frequency pair is loaded on the subcarrier frequency $f_i$ corresponding to the i-th activated OAM mode-subcarrier frequency pair simultaneously, to realize I OAM mode-subcarrier frequency pairs hopping simultaneously, so as to generate I vortex electromagnetic wave signals mutually independent and orthogonal in the OAM mode domain and the subcarrier frequency domain. It can be seen that, compared with the anti-jamming probability of the conventional art that activates multiple subcarriers to transmit information, the present disclosure additionally uses the OAM mode domain to enrich the transmission carriers for signal modulation information input by the transmitter, thereby significantly increasing the probability that transmit signals of the anti-jamming system are free of jamming, decreasing the probability of being jammed, and improving the anti-jamming capability of the anti-jamming system. The I mutually independent and orthogonal vortex electromagnetic wave signals are transmitted in space via the transmit uniform circular array antenna.

Step 4: The information is transmitted. The I mutually independent and orthogonal vortex electromagnetic wave signals are transmitted via channels. What needs to be pointed out lies in that the vortex electromagnetic wave signals can be transmitted in line-of-sight channels and sparse multipath channels, where the sparse multipath includes line-of-sight paths, and a small number of non-line-of-sight paths, such as reflecting and scattering paths. It is assumed that the OAM receive antenna module is a circular array antenna with $N_r$ evenly distributed array elements. Theoretically, the number of OAM modes $N_t$ is an integer, and is not limited. The number of receive array elements without overlapping with each other is related to a radius and a carrier wavelength of the receive uniform circular array antenna. $N_r$ may or may not be equal to $N_t$. The receive uniform circular array antenna receives the vortex electromagnetic wave signals from the transmit uniform circular array antenna.

Step 5: De-hopping on the information is performed and jamming signals are filtered out. The receiver of the present disclosure performs the de-hopping on the received I mutually independent and orthogonal vortex electromagnetic wave signals in two mutually independent domains, including the OAM mode domain and the frequency domain, and filters out jamming signals with the orthogonality between OAM modes and the orthogonality between subcarrier frequencies, to obtain signals with a fixed intermediate frequency and without any OAM modes.

Step 6: The jamming probability is calculated. When the receiver filters the jamming signals, some OAM mode-subcarrier frequency pairs selected by the anti-jamming system may be the same as the jamming signals, resulting in that the receiver may fail to distinguish the jamming signals from useful signals. The jamming probability is analyzed and calculated when the signals with the fixed intermediate frequency and without any OAM modes have $I_J$ OAM mode-subcarrier frequency pairs being jammed per hop, where $0 \leq I_J \leq I$. $I_J$ represents the number of jammed OAM mode-subcarrier frequency pairs among I OAM mode-subcarrier frequency pairs. And all possible and different values of $I_J$ are considered to calculate the jamming probability of useful signals being jammed under different $I_J$ values.

Step 7: The binary information bits are output and a conditional bit error rate is calculated. Assuming that the de-hopped signals with the fixed intermediate frequency and without any OAM modes have $I_J$ OAM mode-subcarrier frequency pairs being jammed, and the receiver knows channel state information corresponding to I OAM mode-subcarrier frequency pairs, an estimated transmit binary information bits are output after a maximum likelihood decoder jointly estimates the transmitted I mutually independent and orthogonal vortex electromagnetic wave signals. Then, the conditional bit error rate is calculated by using a moment generating function when the de-hopped signals with the fixed intermediate frequency and without any OAM modes have $I_J$ OAM mode-subcarrier frequency pairs being jammed. It should be known that the maximum likelihood decoder is only a kind of method used to estimate the transmit binary information bits. In practical applications, common methods for estimating the transmit binary information bits include zero-forcing (ZF), minimum mean square error, and maximum combination ratio, all of which can be applied.

Step 8: The average bit error rate is calculated. For all possible and different values of $I_J$, a weighted summation is performed on the conditional bit error rate when the de-hopped signals with the fixed intermediate frequency and without any OAM modes have $I_J$ OAM mode-subcarrier frequency pairs being jammed, to calculate the average bit error rate of the method of index modulation based joint mode frequency hopping with vortex electromagnetic waves for anti-jamming, so as to measure and evaluate the anti-jamming capability of index modulation based joint mode frequency hopping with vortex electromagnetic waves for anti-jamming; wherein the weighted value is the jammed probability when the signals with the fixed intermediate frequencies and without the OAM modes have $I_J$ OAM mode-subcarrier frequency pairs being jammed per hop.

Compared with the conventional art, the present disclosure has the following two beneficial effects: higher spectral efficiency and lower average bit error rate, that is, stronger anti-jamming capability. The present disclosure fully utilizes the two orthogonal domains, including the OAM mode domain and the frequency domain, and combines the OAM modes and the subcarrier frequencies without repeating and in a one-to-one correspondence way to form the OAM mode-subcarrier frequency pair set. Compared with the conventional art that uses the carrier frequencies as the information transmission carriers, the present disclosure uses the OAM mode-subcarrier frequency pairs as the information transmission carriers. Therefore, the present disclosure diversifies options of information transmission carriers. In terms of increasing the spectrum efficiency, the present disclosure uses the two-dimensional index modulation of the OAM mode and the subcarrier frequency to additionally increase the binary information bits of the input signal, thereby significantly increasing the spectrum efficiency of wireless communication systems. In terms of anti-jamming capability, firstly, the diversified options of information transmission carriers in the present disclosure increase the difficulty for jamming signals to track and jam useful signals, and decrease the probability of useful signals being jammed. Secondly, the receiver performs the de-hopping and the filter on the received multiple mutually independent and orthogonal signals in the OAM mode domain and the frequency domain respectively, to completely eliminate the jamming signals inconsistent with the OAM mode-subcarrier frequency pairs used by the useful signals, so as to significantly decrease the probability of useful signals being jammed, and greatly improving the anti-jamming capability of wireless communication anti-jamming systems.

The method of index modulation based joint mode frequency hopping with vortex electromagnetic waves for anti-jamming proposed by the present disclosure can achieve higher spectrum efficiency than the conventional art in the wireless communication systems, thereby increasing the information transmission rate. In addition, due to a new added orthogonal dimension of OAM and the one-to-one correspondence way for combining the OAM with the subcarrier frequency without repeating, the method of index modulation based joint mode frequency hopping with vortex electromagnetic waves for anti-jamming proposed by the present disclosure has stronger anti-jamming capability than the conventional art. Therefore, applying the present disclosure to the wireless communications can achieve the high spectrum efficiency and the strong anti-jamming capability.

Embodiment 4

According to the system and method of index modulation based joint mode frequency hopping with vortex electromagnetic waves for anti-jamming in embodiments 1 to 3, the I OAM mode-subcarrier frequency pairs are combined in step 2 of the present disclosure includes the following steps 2-1 to 2-3.

Step 2-1: The transmit combination mapper controls the transmit OAM mode index selector to select and activate I OAM modes from the $N_t$ OAM modes based on the index modulation information bits, and meanwhile controls the transmit subcarrier index selector to activate I subcarriers from the $N_f$ subcarriers. In the present disclosure, the number of OAM modes activated by the transmit OAM mode index selector and the number of subcarriers activated by the transmit subcarrier index selector do not need to be the same.

Step 2-2: The activated I OAM modes and I subcarriers are combined into I OAM mode-subcarrier frequency pairs without repeating and in a one-to-one correspondence way based on $p_1$ in step 1; assuming that the activated OAM modes are $\{-1, +1\}$, and the activated subcarrier frequencies are $\{f_1, f_2\}$, available OAM mode-subcarrier frequency pair sets comprises $\{(-1, f_1), (+1, f_2)\}$ or $\{(-1, f_2), (+1, f_1)\}$; according to the index modulation information bits, an OAM mode-subcarrier frequency pair set that matches $p_1$ is selected from the above two sets.

Step 2-3: Due to the activated I OAM modes and the activated I subcarriers being combined without repeating and in a one-to-one correspondence way, there is a total of $2^{p_t}$ combination patterns of the OAM mode-subcarrier frequency pairs as information transmission carriers, that is, $2^{p_t}$ options are available for each hop of the index modulation information bits, wherein $p_1 = \lfloor \log_2[C(N_t,I)C(N_t,I)I!] \rfloor$. In the $p_1$ expression, $\lfloor \cdot \rfloor$ is the floor function, I! is the factorial of I, and $C(N_t,I)$ is a binomial coefficient, representing a number of combinations for taking I from $N_t$. The former $p_1$ information bits transmitted by per frame of the system of the present disclosure are one type of information bits that is regularly selected from $2^{p_t}$ types of index modulation information bits, so that the signal transmit carrier changes regularly.

The present disclosure fully utilizes the two orthogonal domains, including the OAM mode domain and the frequency domain, and combines the OAM modes and the subcarrier frequencies without repeating and in the one-to-one correspondence way to form the OAM mode-subcarrier frequency pair set, so as to diversify options of the OAM mode-subcarrier frequency pairs as the information transmission carriers. It should be known that, compared with the number of the information transmission carriers $2^{\lfloor \log_2 \lfloor \log_2 C(N_f,D) \rfloor \rfloor}$ in the conventional art, the present disclosure uses the OAM mode-subcarrier frequency pairs as the information transmission carriers to significantly increase the number of the information transmission carriers, thereby significantly increasing the difficulty of useful signals being jammed, and improving the anti-jamming capability of the wireless communication anti-jamming systems.

Embodiment 5

According to the system and method of index modulation based joint mode frequency hopping with vortex electromagnetic waves for anti-jamming in embodiments 1 to 4, the de-hopping on the information is performed and the jamming signals are filtered out in step 5 including the following steps 5-1 to 5-3.

Step 5-1: The OAM mode-subcarrier frequency pair index is confirmed, wherein, it is assumed that the transmit combination mapper and the receive combination mapper are strictly synchronized with each other and share the same OAM mode-subcarrier combination key; according to the preset OAM mode-subcarrier combination key, the receive combination mapper confirms the OAM mode-subcarrier frequency pair set carrying the transmit signals that carry multiple mutually independent and orthogonal vortex electromagnetic wave signals.

Step 5-2: The de-hopping on the frequency domain information is performed and the jamming signals are filtered out. According to the subcarrier frequency set determined in step 5-1, the received I signals are respectively multiplied by $\cos(2\pi f_i t)$ for the de-hopping purpose, where t is the time variable. The jamming signals that do not use the subcarrier as the information transmission carrier are filtered out via the BPF, to obtain I OAM mode signals with the fixed intermediate frequency.

Step 5-3: The de-hopping on the OAM mode domain information is performed and the jamming signals are filtered out. The I OAM mode signals with the fixed intermediate frequency obtained in step 5-2 are multiplied by a corresponding OAM mode phase factor $$e^{-j\frac{2\pi}{N_t}l_i}$$

according to the OAM mode-subcarrier frequency pair set determined in step 5-1, signals of all receive array elements in the receive uniform circular array on a same branch are added together, and the FFT algorithm on the mode $l_t$ are performed to de-hop the OAM mode, so as to obtain the received signals with the fixed intermediate frequency and without any OAM modes.

In the present disclosure, it is assumed that the jamming signal has the same OAM transmit antenna module as the anti-jamming system, and can use the same number of the OAM modes and the subcarriers as the useful signals. In a process of filtering out jamming signals, even if the jamming signals activate the same OAM mode and subcarrier frequency as the anti-jamming system via the transmit OAM mode index selector and the transmit subcarrier index selector, the jamming signals will be completely filtered out when the OAM mode-subcarrier frequency pair of the jamming signal is inconsistent with that of the useful signal. It should be noted that, the present disclosure is also applicable to other scenarios where the jamming signals have an OAM transmit antenna module that is different from the anti-jamming system, and the number of available OAM modes and the number of available subcarriers are inconsistent with those of the anti-jamming system. Compared with the conventional art that eliminates the jamming signals in one-dimensional subcarrier frequency, the present disclosure can effectively eliminate jamming signals by filtering jamming signals and decreasing the jamming probability of signals being jammed based on the two-dimensional OAM mode and subcarrier frequency.

Embodiment 6

According to the system and method of index modulation based joint mode frequency hopping with vortex electromagnetic waves for anti-jamming in embodiments 1 to 5, the total number of information bits per p frame transmitted by the transmitter of the present disclosure is calculated by using the following equation:

$$p = \lfloor \log_2[C(N_t,I)C(N_f,I)I!] \rfloor + I\log_2 M$$

Wherein, $\lfloor \cdot \rfloor$ is the floor function; M is the information modulation order; $N_t$ is the total number of available OAM modes; $N_f$ is the total number of available subcarriers; $C(N_t,I)$ is the binomial coefficient, representing the number of combinations for taking I objects from $N_t$ objects; I! is the factorial of the number I.

When the same number of the information carriers are used to carry the M-ary constellation points and $N_f$ subcarriers are available for the anti-jamming system in both the existing frequency hopping method and the present disclosure, the total number of the information bits per frame transmitted by the transmitter in the existing frequency hopping method is $\lfloor \log_2[C(N_f,I)] \rfloor + I\log_2 M$, whereas the present disclosure increases the total number of the information bits by $\lfloor \log_2[C(N_t,I)C(N_f,I)I!] \rfloor - \lfloor \log_2[C(N_f,I)] \rfloor$ bits, thereby increasing the spectrum efficiency of the wireless communication anti-jamming systems.

Embodiment 7

According to the system and method of index modulation based joint mode frequency hopping with vortex electromagnetic waves for anti-jamming in embodiments 1 to 6, the jamming probability is calculated in step 6 of the present disclosure based on the following equation. It is assumed that each OAM mode-subcarrier frequency pair has the same jamming probability, based on an inclusion-exclusion principle, the probability of the useful signals being jamming obtained by the present disclosure is calculated using the following equation:

$$P(I_J|I) = \frac{\binom{I}{I_J}\left[\binom{N_t-I_J}{I-I_J}\binom{N_f-I_J}{I-I_J}(I-I_J)! - \sum_{j=1}^{I-I_J}(-1)^{j-1}\binom{I-I_J}{j}\binom{N_t-I_J-j}{I-I_J-j}\binom{N_t-I_J-j}{I-I_J-j}(I-I_J-1)!\right]}{\binom{N_t}{I}\binom{N_f}{I}I!}$$

Wherein, $P(I_J|I)$ is the probability when I activated OAM mode-subcarrier frequency pairs have $I_J$ thereof jammed; I is the number of the OAM mode-subcarrier frequency pairs carrying information in the anti-jamming system; $I_J$ is the number of the OAM mode-subcarrier frequency pairs jammed among I OAM mode-subcarrier frequency pairs; $N_f$ is the total number of available subcarriers; $N_t$ is the total number of available OAM modes. When the probability of useful signals being jammed is calculated in the present disclosure, if $N_f-I<I-I_J$ or $N_t-I<I-I_J$, the jamming probability is 0, which means that this situation will not occur.

Compared with the existing frequency hopping anti-jamming technique that uses the subcarriers as the information transmission carriers, the present disclosure uses the OAM mode-subcarrier frequency pairs as the information transmission carriers. When the number of information carriers used to carry the M-ary constellation points is the same and the number of the subcarriers available for the anti-jamming system is $N_f$ in both the existing frequency hopping anti-jamming technique and the present disclosure, the probability of useful signals being jammed in the existing frequency hopping anti-jamming technique is calculated as $$\binom{I}{I_J}\binom{N_f-I}{I-I_J}\Big/\binom{N_f}{I},$$

and the jamming probability is 0 if $N_f-I<I-I_J$, which means that this situation will not occur. A comparison about jamming probability between the present disclosure and the existing frequency hopping technique indicates that the present disclosure has a relatively high probability that useful signals would not be jammed, and a relatively low jamming probability. The present disclosure improves the anti-jamming capability of the wireless communication anti-jamming systems.

The present disclosure belongs to the technical field of the wireless communications, and mainly relates to the vortex electromagnetic wave for anti-jamming. The method includes the following steps: The binary information bits input by the system of index modulation based joint mode frequency hopping with vortex electromagnetic waves for anti-jamming are divided into the signal modulation information bits and the two-dimensional index modulation information bits; the transmit combination mapper controls the transmit OAM mode index selector and the transmit subcarrier index selector to respectively activate several OAM modes and subcarrier frequencies, and combines the activated OAM modes and subcarrier frequencies without repeating and in the one-to-one correspondence way to form the OAM mode-subcarrier frequency pair sets based on the index modulation information; the input signal modulation information bits are loaded to the corresponding OAM mode-subcarrier frequency pairs, and transmitted in space via the transmit uniform circular array antenna the receiver performs the de-hopping on the received signals from the transmit uniform circular array antenna sequentially in the OAM mode domain and the subcarrier frequency domain, and filters out jamming signals thereof. The probability of each OAM mode-subcarrier frequency pair being jammed is analyzed and calculated. According to the state information corresponding to each OAM mode-subcarrier frequency pair and the received signal, the maximum likelihood decoder is used to jointly estimate the multiple signals, so as to recover the jamming-eliminated binary signals input by the transmitter. Then the conditional bit error rate is calculated. Finally, the weighted summation is performed on the conditional error rates based on the jamming probability, to obtain the average bit error rate of the present disclosure. Compared with the conventional art, the present disclosure can simultaneously achieve the stronger anti-jamming capability and the higher spectrum efficiency in the wireless communication systems.

A more detailed embodiment that combines the system and the method is given below to further describe the present disclosure.

Embodiment 8

According to the system and method of index modulation based joint mode frequency hopping with vortex electromagnetic waves for anti-jamming in embodiments 1 to 7, FIG. 1(a) and FIG. 1(b) are block diagrams of the system of index modulation based joint mode frequency hopping with vortex electromagnetic waves for anti-jamming according to the present disclosure. The OAM transmit antenna module and the OAM receive antenna module of the system each includes a uniform circular array. To simplify the calculation, it is assumed that the OAM transmit antenna and the OAM receive antenna are parallel and aligned. It should be noted that the present disclosure is still applicable to scenarios where the OAM transmit antenna module and the OAM receive antenna module are not parallel and not aligned. The OAM transmit antenna module and the OAM receive antenna module are not limited to the uniform circular array antennas. New antennas with metasurface materials, spiral phase plate antennas, and concentric circular antennas can also be applied. In addition, the present disclosure can adopt slow hopping work mode, that is, only one frame of signals is transmitted at one hop, which can improve the anti-jamming capability and increase the spectrum efficiency of the wireless communication systems on the precondition that the cost of the transmit and receive index selectors are low. When the anti-jamming capability is relatively high, the present disclosure can also adopt fast mode frequency hopping work mode, that is, the hopping speed is higher than the information transmission rate, which can make full use of the diversity effect brought by the hopping speed, thereby greatly improving the anti-jamming capability of the wireless communication systems.

Referring to FIG. 2, the method of index modulation based joint mode frequency hopping with vortex electromagnetic waves for anti-jamming according to the present disclosure includes the following steps 1-8.

Step 1: The binary information is divided. The input binary information bits are divided into the signal modulation information bits and the index modulation information bits according to the information modulation and the index modulation. The total number of information bits transmitted by the system per frame is $p=p_1+p_2$, where the former $p_1$ bits represent the index modulation information bits for selecting which of the OAM mode-subcarrier frequency pairs is/are selected and activated by the vortex electromagnetic wave mode frequency hopping system; the latter $p_2$ bits represent the information bits required by the activated OAM mode-subcarrier frequency pairs for transmitting the M-ary modulation.

Step 2: The index modulation and the information modulation are performed. A combination pattern is activated according to the OAM mode-subcarrier frequency pairs selected in step 1 to complete the index modulation. In this embodiment, a multi-mode vortex electromagnetic wave is generated based on the uniform circular array antenna, and arrays of the transmit and receive uniform circular array antennas are parallel and aligned. It is assumed that $N_t$ and $N_f$ array elements of the transmit and receive circular array antennas are uniformly distributed around a circle, respectively. Therefore, $N_t$ modes can be generated. It is assumed that the total number of available subcarriers in the system of index modulation based joint mode frequency hopping with vortex electromagnetic waves for anti-jamming is $N_f$. According to the index modulation information bits in step 1, the transmit combination mapper of the present disclosure controls the transmit OAM mode index selector to select and activate I OAM modes from $N_t$ modes, and meanwhile controls the transmit subcarrier index selector to activate I subcarriers from $N_f$ subcarriers. The activated modes and subcarriers are combined in the one-to-one correspondence way, without using the OAM modes and subcarrier frequencies repeatedly. Assuming that the activated OAM modes are $\{-1, +1\}$ and the activated subcarrier frequencies are $\{f_1, f_2\}$, the available OAM mode-subcarrier frequency pair set is $\{(-1, f_1), (+1, f_2)\}$ or $\{(-1, f_2), (+1, f_1)\}$. Therefore, there are a total of $2^{p_1}$ OAM mode-subcarrier frequency pair combination patterns, where $p_1$ determines the OAM mode-subcarrier frequency pair pattern of the OAM mode and subcarrier combination activated by the transmit OAM mode index selector and the transmit subcarrier index selector. Each activated OAM mode-subcarrier frequency pair carries the constellation point corresponding to the $\log_2 M$ information modulation bits. Therefore, $p_1$ and $p_2$ can be calculated as follows:

$$p_1 = \lfloor \log_2[C(N_t, I)C(N_f, I)I!] \rfloor,$$

$$p_2 = I \log_2 M$$

Wherein, $\lfloor \cdot \rfloor$ is the floor function; $C(N_t, I)$ is the binomial coefficient, representing the number of combinations for taking I objects from $N_t$ objects. When OAM modes and subcarriers are not activated, it can be considered that the transmit power of signals is zero.

When $N_t=4$, the number of available OAM modes is $-1$, $0$, $+1$, and $+2$, respectively. When $N_f=4$, available subcarrier frequency is $f_1$, $f_2$, $f_3$, and $f_4$, respectively. When I=1, 16 available OAM mode-subcarrier frequency pair combination patterns are $(-1, f_1)$, $(-1, f_2)$, $(-1, f_3)$, $(-1, f_4)$, $(0, f_1)$, $(0, f_2)$, $(0, f_3)$, $(0, f_4)$, $(+1, f_1)$, $(+1, f_2)$, $(+1, f_3)$, $(+1, f_4)$, $(+2, f_1)$, $(+2, f_2)$, $(+2, f_3)$, and $(+2, f_4)$, respectively. When the constellation point determined by $p_2$ is s, the correspondence between the index bit $p_1$ and the OAM mode-subcarrier frequency pairs in a frame can be shown in Table 1.

TABLE 1

Correspondence between the index bit $p_1$ and the OAM mode-subcarrier frequency pairs in a frame

| Index bit $p_1$ | Index | OAM mode $[-1\ 0\ +1\ +2]$ | Subcarrier $[f_1\ f_2\ f_3\ f_4]$ |
|---|---|---|---|
| [0 0 0 0] | 1 | [s 0 0 0] | [s 0 0 0] |
| [0 0 0 1] | 2 | [s 0 0 0] | [0 s 0 0] |
| [0 0 1 0] | 3 | [s 0 0 0] | [0 0 s 0] |
| [0 0 1 1] | 4 | [s 0 0 0] | [0 0 0 s] |
| [0 1 0 0] | 5 | [0 s 0 0] | [s 0 0 0] |
| [0 1 0 1] | 6 | [0 s 0 0] | [0 s 0 0] |
| [0 1 1 0] | 7 | [0 s 0 0] | [0 0 s 0] |
| [0 1 1 1] | 8 | [0 s 0 0] | [0 0 0 s] |
| ... | ... | ... | ... |

Step 3: The constellation point information is loaded to realize the hopping of the OAM mode-subcarrier frequency pairs. According to the index modulation and the information modulation, each activated OAM mode-subcarrier frequency pair corresponds to a constellation point obtained after the signal modulation. The constellation point information carried by the i-th activated OAM mode-subcarrier frequency pair is fed to all the array elements of the transmit uniform circular array antenna, where $1 \leq i \leq I$, and there is a phase difference $$e^{j\frac{2\pi}{N_t}l_i}$$

between adjacent array elements; where $l_i$ represents the OAM mode order corresponding to the i-th activated OAM mode-subcarrier frequency pair, $|l_i| \leq N_t/2$, and thereby a mutually orthogonal vortex electromagnetic wave signal in the OAM mode domain is generated. The constellation point information corresponding to each OAM mode-subcarrier frequency pair is loaded on the subcarrier frequency $f_i$ corresponding to the i-th activated OAM mode-subcarrier frequency pair simultaneously, to realize I OAM mode-subcarrier frequency pairs hopping simultaneously, so as to generate I mutually independent and orthogonal vortex electromagnetic wave signals in the OAM mode domain and the subcarrier frequency domain. The I mutually independent and orthogonal vortex electromagnetic wave signals are transmitted in space via the transmit uniform circular array antenna.

Step 4: The information is transmitted. The I mutually independent and orthogonal vortex electromagnetic wave signals are transmitted via channels. what needs to be pointed out lies in that the vortex electromagnetic wave signals can be transmitted in line-of-sight channels and sparse multipath channels, where the sparse multipath includes line-of-sight paths and a small number of non-line-of-sight paths, such as reflecting and scattering paths. The receive uniform circular array antenna receives the vortex electromagnetic wave signals transmitted from the transmit uniform circular array antenna.

Step 5: De-hopping on the information is performed and jamming signals are filtered out. The receiver performs the de-hopping on the received I mutually independent and orthogonal vortex electromagnetic wave signals in two mutually independent domains, including the OAM mode domain and the frequency domain, and filters out jamming signals with the orthogonality between OAM modes and the orthogonality between subcarrier frequencies, to obtain signals with a fixed intermediate frequency and without any OAM modes.

Step 6: The jamming probability is calculated. When the receiver filters the jamming signals, several OAM mode-subcarrier frequency pairs selected by the anti-jamming system may be the same as the jamming signals, resulting in that the receiver fails to distinguish the jamming signals from useful signals. The jamming probability is analyzed and calculated when the signals with the fixed intermediate frequency and without any OAM modes have $I_J$ OAM mode-subcarrier frequency pairs being jammed per hop, where $0 \leq I_J \leq I$. And all possible and different values of $I_J$ are considered to calculate the probability of useful signals being jammed under different $I_J$ values.

Step 7: The binary information bits are output and the conditional bit error rate is calculated. Assuming that the de-hopped signals with the fixed intermediate frequency and without any OAM modes have $I_J$ OAM mode-subcarrier frequency pairs being jammed, and the receiver knows channel state information corresponding to I OAM mode-subcarrier frequency pairs, an estimated transmit binary information bits are output after a maximum likelihood decoder jointly estimates the transmit I mutually independent and orthogonal vortex electromagnetic wave signals. Then, the conditional bit error rate is calculated by using the moment generating function when the de-hopped signals with the fixed intermediate frequency and without any OAM modes have $I_J$ OAM mode-subcarrier frequency pairs being jammed.

Step 8: The average bit error rate is calculated. For all possible and different values of $I_J$, a weighted summation is performed on the conditional bit error rate when the de-hopped signals with the fixed intermediate frequency and without any OAM modes have $I_J$ OAM mode-subcarrier frequency pairs being jammed, to calculate the average bit error rate of the method of index modulation based joint mode frequency hopping with vortex electromagnetic waves for anti-jamming, so as to measure and evaluate the anti-jamming capability of index modulation based joint mode frequency hopping with vortex electromagnetic waves for anti-jamming; wherein the weighted value is the jamming probability when the signals with the fixed intermediate frequencies and without the OAM modes have $I_J$ OAM mode-subcarrier frequency pairs being jammed per hop.

In short, the system and method of index modulation based joint mode frequency hopping with vortex electromagnetic waves for anti-jamming in the present disclosure solve the problem of the conventional art that it is difficult to guarantee the anti-jamming capability of wireless communication systems while significantly increasing the spectrum efficient under limited spectrum resources. The anti-jamming system is additionally provided with a transmit signal carrier selector that provides diversified options, a receive signal carrier selector that is strictly synchronized with the transmit signal carrier selector, and a group of FFT modules, to output a binary demodulation signal with jamming eliminated, thereby implementing the anti-jamming of the system. The method includes: dividing the binary information; performing the index modulation and the information modulation; loading the constellation point information to realize the hopping of the OAM mode-subcarrier frequency pairs; transmitting the information; performing the de-hopping on the information and filtering out the jamming signals; calculating the jamming probability and outputting the average bit error rate. The present disclosure fully utilizes the OAM mode domain and the frequency domain, and combines the OAM modes and the subcarrier frequencies without repeating and in a one-to-one correspondence way to form the OAM mode-subcarrier frequency pair set, so as to diversify the information transmission carriers. The index modulation is used to realize multiple OAM mode-subcarrier frequency pairs hopping simultaneously, which increases the spectrum efficiency, decreases the probability of useful signals being jammed, and improves the anti-jamming capability. Compared with the conventional art, the present disclosure can achieve both stronger anti-jamming capability and higher spectrum efficiency in wireless communication systems, and is applicable to the anti-jamming communication scenarios, such as indoor local area networks, cellular network communications, and radar.

What is claimed is:

1. A system of index modulation based joint mode frequency hopping with vortex electromagnetic waves for anti-jamming, wherein the system comprises a transmitter and a receiver; the transmitter and the receiver each comprises a subcarrier index selector configured to determine a carrier for signal transmission; the transmitter transmits an input signal to a transmit antenna module via a signal modulation module; after the signal from the transmit antenna module is received by a receive antenna module, a binary demodulation signal is output after the signal is processed by a carrier demodulation and a band pass filter (BPF) sequentially; wherein, the transmitter is provided with a selector for selecting diversely signal transmit carriers between the input signal and the transmit antenna module, the signal transmit carrier selector is formed by a one-way serial connection of a transmit combination mapper and two parallel transmit index selectors, and the two parallel transmit index selectors are respectively a transmit orbital angular momentum (OAM) mode index selector and a transmit subcarrier index selector; the transmit antenna module is an OAM transmit antenna module; the receiver is provided with a signal receive carrier selector that is strictly synchronized with the signal transmit carrier selector between the receive antenna module and the BPF, the signal receiving carrier selector is formed by a direct one-way serial connection between two parallel receive index selectors and a receive combination mapper, the two parallel receive index selectors are respectively a receive OAM mode index selector and a receive subcarrier index selector; a received signal of the receiver is sequentially transmitted to the receive combination mapper, the two parallel index selectors, and the BPF; the receive antenna module is an OAM receive antenna module; a group of fast Fourier transformation (FFT) modules are provided between the BPF and an output signal; after the signal transmitted from the OAM transmit antenna module is received by the OAM receive antenna module, the signal is processed by the receive combination mapper, the two parallel receive index selectors, the BPF, and the FFT module sequentially, and the binary demodulation signal with jamming eliminated is output as binary information bits.

2. The system of index modulation based joint mode frequency hopping with vortex electromagnetic waves for anti-jamming according to claim 1, wherein a total number of the binary information bits at each frame of the input signal of the transmitter is $p=p_1+p_2$, wherein the former $p_1$ bits are the binary information bits for two-dimensional index modulation information, and the latter $p_2$ bits are the binary information bits for signal modulation; wherein the two-dimensional index refers to the OAM mode index and the subcarrier frequency index; the OAM transmit antenna module of the transmitter transmits multiple mutually independent and orthogonal vortex electromagnetic beams; the OAM receive antenna module of the receiver receives the multiple mutually independent and orthogonal vortex electromagnetic beams transmitted by the OAM transmit antenna module, and the receiver finally outputs the binary information bits with jamming eliminated that contain the two-dimensional index modulation and the signal modulation.

3. A method of index modulation based joint mode frequency hopping with vortex electromagnetic waves for anti-jamming, wherein the method is implemented based on the system of index modulation based joint mode frequency hopping with vortex electromagnetic waves for anti-jamming according to claim 1, and comprises the following steps:

step 1: dividing the binary information; wherein the binary information bits input by the system of index modulation based joint mode frequency hopping with vortex electromagnetic waves for anti-jamming are divided into signal modulation information bits and two-dimensional index modulation information bits; it is assumed that the total number of information bits of each frame transmitted by the system of index modulation based joint mode frequency hopping with vortex electromagnetic waves for anti-jamming is $p=p_1+p_2$, wherein the former $p_1$ bits represent the index modulation information bits corresponding to OAM mode-subcarrier frequency pairs combined by activated OAM modes and activated subcarriers, and the latter $p_2$ bits represent the signal modulation information bits required by the activated OAM mode-subcarrier frequency pairs for transmitting an M-ary signal modulation;

step 2: performing the index modulation and an information modulation; wherein, it is assumed that the OAM transmit antenna module and the OAM receive antenna module respectively uses a circular array antenna with $N_t$ and $N_f$ evenly distributed array elements, and the OAM transmit antenna module is configured to generate $N_t$ OAM modes; it is further assumed that a total number of available subcarriers by the system of index modulation based joint mode frequency hopping with vortex electromagnetic waves for anti-jamming is $N_f$; I OAM mode-subcarrier frequency pairs are formed, the transmit combination mapper is configured to control the transmit OAM mode index selector to select and activate I OAM modes from the $N_t$ OAM modes based on the index modulation information bits, and meanwhile to control the transmit subcarrier index selector to activate I subcarriers from the $N_f$ subcarriers, and the activated I OAM modes and the activated I subcarriers are combined into I OAM mode-subcarrier frequency pairs without repeating and in a one-to-one correspondence way based on the index modulation information bits; $\log_2 M$ signal modulation information bits are mapped to a constellation point after an M-ary modulation, wherein one constellation point is carried by each OAM mode-subcarrier frequency pair, and then there is $p_2 = I \log_2 M$;

step 3: loading the constellation point information to realize the hopping of the OAM mode-subcarrier frequency pairs; wherein the constellation point information carried by the i-th activated OAM mode-subcarrier frequency pair is fed to all the array elements of a transmit uniform circular array antenna, to generate mutually orthogonal vortex electromagnetic wave signals, wherein 1≤i≤I, and there is a phase difference $$e^{j\frac{2\pi}{N_t} l_i}$$

between adjacent array elements; wherein $l_i$ represents an OAM mode order corresponding to the i-th activated OAM mode-subcarrier frequency pair, and $|l_i| \leq N_t/2$; the constellation point information carried by each OAM mode-subcarrier frequency pair is loaded on a subcarrier frequency $f_i$ corresponding to the i-th activated OAM mode-subcarrier frequency pair simultaneously, to realize I OAM mode-subcarrier frequency pairs hopping simultaneously, so as to generate I mutually independent and orthogonal vortex electromagnetic wave signals; and the I mutually independent and orthogonal vortex electromagnetic wave signals are transmitted via the transmit uniform circular array antenna;

step 4: transmitting the information; wherein the I mutually independent and orthogonal vortex electromagnetic wave signals are transmitted via channels, and the vortex electromagnetic wave signals transmitted from the transmit uniform circular array antenna are received by a receive uniform circular array antenna;

step 5: performing a de-hopping on the information and filtering out jamming signals: the receiver performs the de-hopping on the received I mutually independent and orthogonal vortex electromagnetic wave signals in two mutually independent domains, including an OAM mode domain and a frequency domain, and filters out jamming signals with an orthogonality between OAM modes and an orthogonality between subcarrier frequencies, to obtain signals with a fixed intermediate frequency and without any OAM modes;

step 6: calculating a jamming probability; wherein the jamming probability is analyzed and calculated when the signals with the fixed intermediate frequency and without any OAM modes have $I_J$ OAM mode-subcarrier frequency pairs being jammed per hop, wherein $0 \leq I_J \leq I$; and all possible and different values of $I_J$ are considered to calculate the probability of useful signals being jammed under different $I_J$ values;

step 7: outputting the binary information bits and calculating a conditional bit error rate; wherein, assuming that the de-hopped signals with the fixed intermediate frequency and without any OAM modes have $I_J$ OAM mode-subcarrier frequency pairs being jammed, and the receiver knows channel state information corresponding to I OAM mode-subcarrier frequency pairs, an estimated transmit binary information bits are output after a maximum likelihood decoder jointly estimates the transmit I mutually independent and orthogonal vortex electromagnetic wave signals; and the conditional bit error rate is calculated by using a moment generating function when the de-hopped signals with the fixed intermediate frequency and without any OAM modes have $I_J$ OAM mode-subcarrier frequency pairs being jammed; and step 8: calculating an average bit error rate; wherein, for all possible and different values of $I_J$, a weighted summation is performed on the conditional bit error rate when the de-hopped signals with the fixed intermediate frequency and without any OAM modes have $I_J$ OAM mode-subcarrier frequency pairs being jammed, to calculate the average bit error rate of the method of index modulation based joint mode frequency hopping with vortex electromagnetic waves for anti-jamming, so as to measure and evaluate an anti-jamming capability of index modulation based joint mode frequency hopping with vortex electromagnetic waves for anti-jamming; wherein the weighted value is the jamming probability when the signals with the fixed intermediate frequencies and without the OAM modes have $I_J$ OAM mode-subcarrier frequency pairs being jammed per hop.

4. The method of index modulation based joint mode frequency hopping with vortex electromagnetic waves for anti-jamming according to claim 3, wherein the combining into I OAM mode-subcarrier frequency pairs in step 2 comprises:

step 2-1: by the transmit combination mapper, controlling the transmit OAM mode index selector to select and activate I OAM modes from the $N_t$ OAM modes based on the index modulation information bits, and meanwhile controlling the transmit subcarrier index selector to activate I subcarriers from the $N_f$ subcarriers;

step 2-2: combining the activated I OAM modes and I subcarriers into I OAM mode-subcarrier frequency pairs without repeating and in a one-to-one correspondence way based on $p_1$ in step 1; assuming that the activated OAM modes are $\{-1, +1\}$, and the activated subcarrier frequencies are $\{f_1, f_2\}$, available OAM mode-subcarrier frequency pair sets comprising $\{(-1, f_1), (-1, f_2)\}$ or $\{(-1, f_2), (+1, f_1)\}$; according to the index modulation information bits, selecting an OAM mode-subcarrier frequency pair set that matches $p_1$ from the above two sets; and step 2-3: due to the activated I OAM modes and the activated I subcarriers being combined without repeating and in a one-to-one correspondence way, there being a total $2^{p_1}$ combination patterns of the OAM mode-subcarrier frequency pairs as information transmission carriers, that is, $2^{p_1}$ options being available for each hop of the index modulation information bits, wherein $p_1 = \lfloor \log_2[C(N_t, I)C(N_f, I)I!] \rfloor$; in the $p_1$ expression, $\lfloor \cdot \rfloor$ is a floor function, and $C(N_t,I)$ is a binomial coefficient, representing a number of combinations for taking I from $N_t$.

5. The method of index modulation based joint mode frequency hopping with vortex electromagnetic waves for anti-jamming according to claim 4, wherein the performing the de-hopping on the information and filtering out jamming signals in step 5 comprises the following steps:

step 5-1: confirming the OAM mode-subcarrier frequency pair index; wherein, it is assumed that the transmit combination mapper and the receive combination mapper are strictly synchronized with each other and share a same OAM mode-subcarrier combination key; according to a preset OAM mode-subcarrier combination key, the receive combination mapper confirms the OAM mode-subcarrier frequency pair set carrying the transmit multiple mutually independent and orthogonal vortex electromagnetic wave signals;

step 5-2: performing the de-hopping on the received I signals according to the subcarrier frequency set determined in step 5-1, and filtering out jamming signals that do not select the subcarrier via the BPF to obtain I OAM mode signals with the fixed intermediate frequency; and step 5-3: multiplying the I OAM mode signals carrying the OAM mode obtained in step 5-2 by corresponding OAM mode phase factors according to the OAM mode-subcarrier frequency pair set determined in step 5-1, adding together signals of all receiving array elements on a same branch, and performing the FFT algorithm on the OAM mode to de-hop the OAM mode, so as to obtain the received signals with the fixed intermediate frequency and without any OAM modes.

6. The method of index modulation based joint mode frequency hopping with vortex electromagnetic waves for anti-jamming according to claim 3, wherein the performing the de-hopping on the information and filtering out jamming signals in step 5 comprises the following steps:

step 5-1: confirming the OAM mode-subcarrier frequency pair index; wherein, it is assumed that the transmit combination mapper and the receive combination mapper are strictly synchronized with each other and share a same OAM mode-subcarrier combination key, according to a preset OAM mode-subcarrier combination key, the receive combination mapper confirms the OAM mode-subcarrier frequency pair set carrying the transmit multiple mutually independent and orthogonal vortex electromagnetic wave signals;

step 5-2: performing the de-hopping on the received I signals according to the subcarrier frequency set determined in step 5-1, and filtering out jamming signals that do not select the subcarrier via the BPF to obtain I OAM mode signals with the fixed intermediate frequency; and step 5-3: multiplying the I OAM mode signals carrying the OAM mode obtained in step 5-2 by corresponding OAM mode phase factors according to the OAM mode-subcarrier frequency pair set determined in step 5-1, adding together signals of all receiving array elements on a same branch, and performing the FFT algorithm on the OAM mode to de-hop the OAM mode, so as to obtain the received signals with the fixed intermediate frequency and without any OAM modes.

7. The method of index modulation based joint mode frequency hopping with vortex electromagnetic waves for anti-jamming according to claim 3, wherein the total number of information bits p transmitted per frame is calculated by using the following equation:

$$p_1 = \lfloor \log_2[C(N_t,I)C(N_f,I)I!] \rfloor + I \log_2 M$$

wherein, $\lfloor \cdot \rfloor$ is the floor function; M is an information modulation order; $N_t$ is a total number of available OAM modes; $N_f$ is a total number of the available subcarriers; $C(N_t, I)$ is a binomial coefficient, representing a number of combinations for taking I from $N_t$; I! is a factorial of I.

8. The method of index modulation based joint mode frequency hopping with vortex electromagnetic waves for anti-jamming according to claim 3, wherein the calculating the jamming probability in step 6 is based on the following equation:

$$P(I_J|I) = \frac{\binom{I}{I_J}\left[\binom{N_t-I_J}{I-I_J}\binom{N_f-I_J}{I-I_J}(I-I_J)! - \sum_{j=1}^{I-I_J}(-1)^{j-1}\binom{I-I_J}{j}\binom{N_t-I_J-j}{I-I_J-j}\binom{N_t-I_J-j}{I-I_J-j}(I-I_J-1)!\right]}{\binom{N_t}{I}\binom{N_f}{I}I!}$$

wherein, $P(I_J|I)$ is a probability when I activated OAM mode-subcarrier frequency pairs have $I_J$ thereof jammed; I is a number of the OAM mode-subcarrier frequency pairs carrying information in the anti-jamming system; $I_J$ is the number of the OAM mode-subcarrier frequency pairs jammed among I OAM mode-subcarrier frequency pairs; $N_f$ is the total number of available subcarriers; $N_t$ is a total number of available OAM modes.

9. A method of index modulation based joint mode frequency hopping with vortex electromagnetic waves for anti-jamming, wherein the method is implemented based on the system of index modulation based joint mode frequency hopping with vortex electromagnetic waves for anti-jamming according to claim 2, and comprises the following steps:

step 1: dividing the binary information; wherein the binary information bits input by the system of index modulation based joint mode frequency hopping with vortex electromagnetic waves for anti-jamming are divided into signal modulation information bits and two-dimensional index modulation information bits; it is assumed that the total number of information bits of each frame transmitted by the system of index modulation based joint mode frequency hopping with vortex electromagnetic waves for anti-jamming is $p=p_1+p_2$, wherein the former $p_1$ bits represent the index modulation information bits corresponding to OAM mode-subcarrier frequency pairs combined by activated OAM modes and activated subcarriers, and the latter $p_2$ bits represent the signal modulation information bits required by the activated OAM mode-subcarrier frequency pairs for transmitting an M-ary signal modulation;

step 2: performing the index modulation and an information modulation; wherein, it is assumed that the OAM transmit antenna module and the OAM receive antenna module respectively uses a circular array antenna with $N_t$ and $N_f$ evenly distributed array elements, and the OAM transmit antenna module is configured to generate $N_t$ OAM modes; it is further assumed that a total number of available subcarriers by the system of index modulation based joint mode frequency hopping with vortex electromagnetic waves for anti-jamming is $N_f$; I OAM mode-subcarrier frequency pairs are formed; the transmit combination mapper is configured to control the transmit OAM mode index selector to select and activate I OAM modes from the $N_t$ OAM modes based on the index modulation information bits, and meanwhile to control the transmit subcarrier index selector to activate I subcarriers from the $N_f$ subcarriers, and the activated I OAM modes and the activated I subcarriers are combined into I OAM mode-subcarrier frequency pairs without repeating and in a one-to-one correspondence way based on the index modulation information bits; $\log_2 M$ signal modulation information bits are mapped to a constellation point after an M-ary modulation, wherein one constellation point is carried by each OAM mode-subcarrier frequency pair, and then there is $p_2 = I \log_2 M$;

step 3: loading the constellation point information to realize the hopping of the OAM mode-subcarrier frequency pairs; wherein the constellation point information carried by the i-th activated OAM mode-subcarrier frequency pair is fed to all the array elements of a transmit uniform circular array antenna, to generate mutually orthogonal vortex electromagnetic wave signals, wherein $1 \leq i \leq I$, and there is a phase difference $$e^{j\frac{2\pi}{N_t}l_i}$$

between adjacent array elements; wherein $l_i$ represents an OAM mode order corresponding to the i-th activated OAM mode-subcarrier frequency pair, and $|l_i| \leq N_t/2$; the constellation point information carried by each OAM mode-subcarrier frequency pair is loaded on a subcarrier frequency $f_i$ corresponding to the i-th activated OAM mode-subcarrier frequency pair simultaneously, to realize I OAM mode-subcarrier frequency pairs hopping simultaneously, so as to generate I mutually independent and orthogonal vortex electromagnetic wave signals; and the I mutually independent and orthogonal vortex electromagnetic wave signals are transmitted via the transmit uniform circular array antenna:

step 4: transmitting the information; wherein the I mutually independent and orthogonal vortex electromagnetic wave signals are transmitted via channels, and the vortex electromagnetic wave signals transmitted from the transmit uniform circular array antenna are received by a receive uniform circular array antenna;

step 5: performing a de-hopping on the information and filtering out jamming signals: the receiver performs the de-hopping on the received I mutually independent and orthogonal vortex electromagnetic wave signals in two mutually independent domains, including an OAM mode domain and a frequency domain, and filters out jamming signals with an orthogonality between OAM modes and an orthogonality between subcarrier frequencies, to obtain signals with a fixed intermediate frequency and without any OAM modes;

step 6: calculating a jamming probability; wherein the jamming probability is analyzed and calculated when the signals with the fixed intermediate frequency and without any OAM modes have $I_J$ OAM mode-subcarrier frequency pairs being jammed per hop, wherein $0 \leq I_J \leq I$; and all possible and different values of $I_J$ are considered to calculate the probability of useful signals being jammed under different $I_J$ values;

step 7: outputting the binary information bits and calculating a conditional bit error rate; wherein, assuming that the de-hopped signals with the fixed intermediate frequency and without any OAM modes have $I_J$ OAM mode-subcarrier frequency pairs being jammed, and the receiver knows channel state information corresponding to I OAM mode-subcarrier frequency pairs, an estimated transmit binary information bits are output after a maximum likelihood decoder jointly estimates the transmit I mutually independent and orthogonal vortex electromagnetic wave signals; and the conditional bit error rate is calculated by using a moment generating function when the de-hopped signals with the fixed intermediate frequency and without any OAM modes have $I_J$ OAM mode-subcarrier frequency pairs being jammed; and step 8: calculating an average bit error rate; wherein, for all possible and different values of $I_J$, a weighted summation is performed on the conditional bit error rate when the de-hopped signals with the fixed intermediate frequency and without any OAM modes have $I_J$ OAM mode-subcarrier frequency pairs being jammed, to calculate the average bit error rate of the method of index modulation based joint mode frequency hopping with vortex electromagnetic waves for anti-jamming, so as to measure and evaluate an anti-jamming capability of index modulation based joint mode frequency hopping with vortex electromagnetic waves for anti-jamming; wherein the weighted value is the jamming probability when the signals with the fixed intermediate frequencies and without the OAM modes have $I_J$ OAM mode-subcarrier frequency pairs being jammed per hop.

10. The method of index modulation based joint mode frequency hopping with vortex electromagnetic waves for anti-jamming according to claim 9, wherein the combining into I OAM mode-subcarrier frequency pairs in step 2 comprises:

step 2-1: by the transmit combination mapper, controlling the transmit OAM mode index selector to select and activate I OAM modes from the $N_t$ OAM modes based on the index modulation information bits, and meanwhile controlling the transmit subcarrier index selector to activate I subcarriers from the $N_f$ subcarriers;

step 2-2: combining the activated I OAM modes and I subcarriers into I OAM mode-subcarrier frequency pairs without repeating and in a one-to-one correspondence way based on $p_1$ in step 1; assuming that the activated OAM modes are $\{-1, +1\}$, and the activated subcarrier frequencies are $\{f_1, f_2\}$, available OAM mode-subcarrier frequency pair sets comprising $\{(-1, f_1), (-1, f_2)\}$ or $\{(-1, f_2), (+1, f_1)\}$; according to the index modulation information bits, selecting an OAM mode-subcarrier frequency pair set that matches $p_1$ from the above two sets; and step 2-3: due to the activated I OAM modes and the activated I subcarriers being combined without repeating and in a one-to-one correspondence way, there being a total of $2^{p_t}$ combination patterns of the OAM mode-subcarrier frequency pairs as information transmission carriers, that is, $2^{p_t}$ options being available for each hop of the index modulation information bits, wherein $p_1 = \lfloor \log_2[C(N_t,I)C(N_f,I)I!] \rfloor$; in the $p_1$ expression, $\lfloor \cdot \rfloor$ is a floor function, and $C(N_t,I)$ is a binomial coefficient, representing a number of combinations for taking I from $N_t$.

11. The method of index modulation based joint mode frequency hopping with vortex electromagnetic waves for anti-jamming according to claim 10, wherein the performing the de-hopping on the information and filtering out jamming signals in step 5 comprises the following steps:

step 5-1: confirming the OAM mode-subcarrier frequency pair index; wherein, it is assumed that the transmit combination mapper and the receive combination mapper are strictly synchronized with each other and share a same OAM mode-subcarrier combination key; according to a preset OAM mode-subcarrier combination key, the receive combination mapper confirms the OAM mode-subcarrier frequency pair set carrying the transmit multiple mutually independent and orthogonal vortex electromagnetic wave signals;

step 5-2: performing the de-hopping on the received I signals according to the subcarrier frequency set determined in step 5-1, and filtering out jamming signals that do not select the subcarrier via the BPF to obtain I OAM mode signals with the fixed intermediate frequency; and step 5-3: multiplying the I OAM mode signals carrying the OAM mode obtained in step 5-2 by corresponding OAM mode phase factors according to the OAM mode-subcarrier frequency pair set determined in step 5-1, adding together signals of all receiving array elements on a same branch, and performing the FFT algorithm on the OAM mode to de-hop the OAM mode, so as to obtain the received signals with the fixed intermediate frequency and without any OAM modes.

12. The method of index modulation based joint mode frequency hopping with vortex electromagnetic waves for anti-jamming according to claim 9, wherein the performing the de-hopping on the information and filtering out jamming signals in step 5 comprises the following steps:

step 5-1: confirming the OAM mode-subcarrier frequency pair index; wherein, it is assumed that the transmit combination mapper and the receive combination mapper are strictly synchronized with each other and share a same OAM mode-subcarrier combination key; according to a preset OAM mode-subcarrier combination key, the receive combination mapper confirms the OAM mode-subcarrier frequency pair set carrying the transmit multiple mutually independent and orthogonal vortex electromagnetic wave signals;

step 5-2: performing the de-hopping on the received I signals according to the subcarrier frequency set determined in step 5-1, and filtering out jamming signals that do not select the subcarrier via the BPF to obtain I OAM mode signals with the fixed intermediate frequency; and step 5-3: multiplying the I OAM mode signals carrying the OAM mode obtained in step 5-2 by corresponding OAM mode phase factors according to the OAM mode-subcarrier frequency pair set determined in step 5-1, adding together signals of all receiving array elements on a same branch, and performing the FFT algorithm on the OAM mode to de-hop the OAM mode, so as to obtain the received signals with the fixed intermediate frequency and without any OAM modes.

13. The method of index modulation based joint mode frequency hopping with vortex electromagnetic waves for anti-jamming according to claim 9, wherein the total number of information bits p transmitted per frame is calculated by using the following equation:

$$p_1 = \lfloor \log_2[C(N_t,I)C(N_f,I)I!] \rfloor + I \log_2 M$$

wherein, $\lfloor \cdot \rfloor$ is the floor function; M is an information modulation order; $N_t$ is a total number of available OAM modes; $N_f$ is a total number of the available subcarriers; $C(N_t, I)$ is a binomial coefficient, representing a number of combinations for taking I from $N_t$; I! is a factorial of I.

14. The method of index modulation based joint mode frequency hopping with vortex electromagnetic waves for anti-jamming according to claim 9, wherein the calculating the jamming probability in step 6 is based on the following equation:

$$P(I_J|I) = \frac{\binom{I}{I_J}\left[\binom{N_t-I_J}{I-I_J}\binom{N_f-I_J}{I-I_J}(I-I_J)! - \sum_{j=1}^{I-I_J}(-1)^{j-1}\binom{I-I_J}{j}\binom{N_t-I_J-j}{I-I_J-j}\binom{N_t-I_J-j}{I-I_J-j}(I-I_J-1)!\right]}{\binom{N_t}{I}\binom{N_f}{I}I!}$$

wherein, $P(I_J|I)$ is a probability when I activated OAM mode-subcarrier frequency pairs have $I_J$ thereof jammed; I is a number of the OAM mode-subcarrier frequency pairs carrying information in the anti-jamming system; $I_J$ is the number of the OAM mode-subcarrier frequency pairs jammed among I OAM mode-subcarrier frequency pairs; $N_f$ is the total number of available subcarriers; $N_t$ is a total number of available OAM modes.

* * * * *